United States Patent [19]

Jezo

[11] 3,836,864

[45] Sept. 17, 1974

[54] METHOD AND APPARATUS FOR DETERMINING TACAN BEARING

[75] Inventor: Maurice L. Jezo, Cedar Grove, N.J.

[73] Assignee: International Telephone and Telegraph Corporation, Nutley, N.J.

[22] Filed: Apr. 19, 1973

[21] Appl. No.: 352,755

[52] U.S. Cl. .................... 331/1 R, 331/15, 331/17, 331/18, 343/113 R

[51] Int. Cl. .................... H03b 3/02, H03b 3/04

[58] Field of Search ............ 331/14, 15, 17, 18, 25, 331/1 R; 343/113 R; 325/417, 418, 419; 328/133, 134

[56] References Cited

UNITED STATES PATENTS 3,419,814 12/1968 Graves et al. .................... 331/25 X

*Primary Examiner*—Herman Karl Saalbach
*Assistant Examiner*—Siegfried H. Grimm
*Attorney, Agent, or Firm*—John T. O'Halloran; Menotti J. Lombardi, Jr.; Vincent Ingrassia

[57] ABSTRACT

This invention relates to a method and apparatus for extracting antenna modulation components by phase locking a locally generated sine wave at the desired frequency with the actual antenna modulation. A phase locked oscillator is triggered at predetermined reference points on the received Tacan signal. The output of the oscillator is phase shifted in the direction of coincidence with th received modulation envelope. A comparator compares the phase shifted signal and the envelope of the received signal and generates an error signal if coincidence does not exist. The error signal is fed back and multiplied betwen phase shifted signal; in one case after the phase shifted signal is limited and in another case after the phase shifted signal is further shifted by 90° and limited. In the first case the result of the multiplication is integrated and used to modify the amplitude of the phase shifted signal. In the second case, the result of the multiplication is integrated and controls the amount of the phase shift imparted on the locally generated signal to achieve coincidence.

4 Claims, 11 Drawing Figures

METHOD AND APPARATUS FOR DETERMINING TACAN BEARING

BACKGROUND OF THE INVENTION

The present invention relates to a method and apparatus for determining bearing in airborne Tacan equipment and more particularly to bearing determination by extracting antenna modulation components by phase locking a sine wave locally generated from the reference signals at the desired frequency with actual antenna modulation.

The concept and operational characteristics of (Tacan) systems are well known. A detailed description may be found in MIL STD 291B. Basically, the Tacan system allows an aircarft to determine its position relative to a Tacan ground beacon. Basically, Tacan is a radio aerial navigation system of the polar-coordinate type wherein there is a bearing facility that provides on the aircraft a meter indication of its direction in degrees of bearing from a ground beacon selected by the pilot. Also, there is a distance facility that provides on the aircraft a meter indication in nautical miles of its distance from the ground beacon. Knowing bearing and distance from a specific geographic point, the pilot can fix his position on a chart.

The bearing information is extracted from phase measurements, and therefore it is necessary to have a fixed frequency of the same frequency that is received at all directions around the beacon with identical phase. As a convenient standard, as defined in MIL–291B, the phase of the reference wave is adjusted so that it is transmitted at the same instant of time that the maximum of the rotating cardioid lobe pattern aims east. In any case, the airborne electrical phase difference measurement would numerically represent the aircraft's geographic bearing, which is conventionally measured clockwise from north. Actually, any other standard adjustment for the reference wave might be adopted; the airborne phase measuring circuits would simply be zero-calibrated accordingly. The north reference group of pulses furnishes suitable reference for measuring the phase of the 15 cycle component of the envelope wave.

To furnish a suitable reference for measuring the phase of a 135 cycle component of the envelope wave, the ground equipment transmits appropriately timed and coded reference signals similar to the north reference group of signals. These secondary reference signals will hereafter be referred to as auxiliary reference pulse groups. In one rotation of the antenna, eight of these groups are transmitted, separated by 40° of rotation. A ninth position is occupied by the north reference signal group.

In past Tacan systems, it was necessary to sample the received antenna modulation components at a sufficiently high rate to reconstruct the modulation envelope. However, since there is now a trend to time share the Tacan receiver in order to perform other functions, such as IFF (Identification Friend or Foe) and communications, it would be highly advantageous to reduce the receiver sampling rate in order to free the receiver to perform the additional desired functions.

SUMMARY OF THE INVENTION

It is an object of the present invention to provide a method and apparatus for extracting Tacan antenna modulation components, and at the same time reduce the sampling rate of the received signal.

It is a further object of the present invention that the necessity of reconstructing the received signal modulation envelope be eliminated.

According to a broad aspect of the invention there is provided an apparatus for generating a local signal which is coincident in phase and in amplitude with a received signal comprising a local oscillator for generating said local signal, means coupled to said local oscillator and to said received signal for triggering said local oscillator at a predetermined point on said received signal, means coupled to the output of said local oscillator and to said received signal for comparing said local signal and said received signal and generating an error signal if said local signal and said received signal are not coincident, phase shifting means coupled between said local oscillator and said comparing means, first means responsive to said error signal for altering the amplitude of said local signal in the direction of coincidence and second means responsive to said error signal for controlling said phase shifting means.

According to a further aspect of the invention there is provided a method for generating a local signal which is coincident in phase and in amplitude with a received signal comprising triggering a local oscillator at a predetermined point on said received signal, phase shifting said local signal in the direction of coincidence with said received signal, comparing said phase shifted signal with said received signal, generating an error signal if said received signal and said local signal are not coincident in phase and/or amplitude, multiplying the amplitude of said phase shifted signal with said error signal to modify the amplitude of said phase shifted signal in the direction of coincidence and modifying in the direction of coincidence the amount of phase shift on said local signal with said error signal.

The above and other objects of the present invention will be more clearly understood from the following detailed description taken in conjunction with the accompanying drawings in which:

DESCRIPTION OF THE PREFERRED EMBODIMENT

Figure 1:
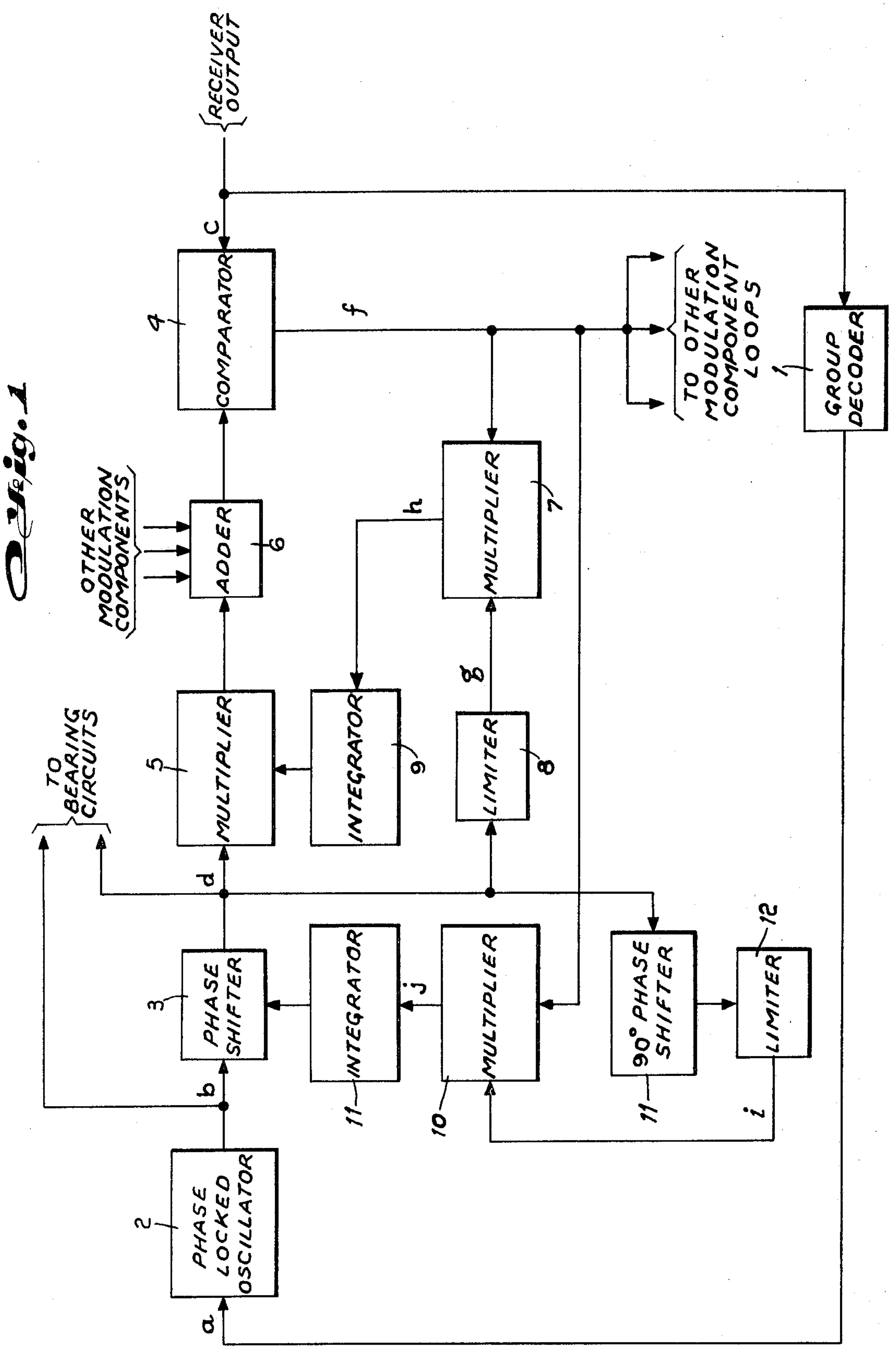
FIG. 1 is a functional block diagram of an airborne Tacan receiver apparatus for extracting antenna modulation components in order to determine bearing.
Figure 2A:
FIGS. 2*a* – 2*j* shows waveforms which occur at various points in the block diagram which aid in the explanation of the operation of FIG. 1.
Figure 2B:
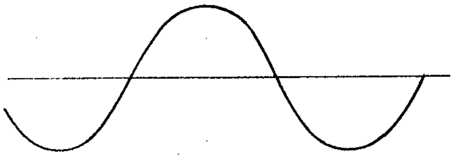
Figure 2C:
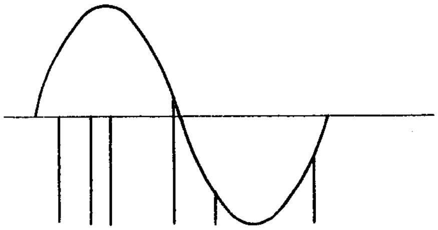
Figure 2D:
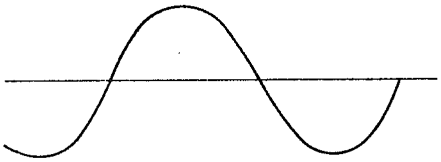
Figure 2E:
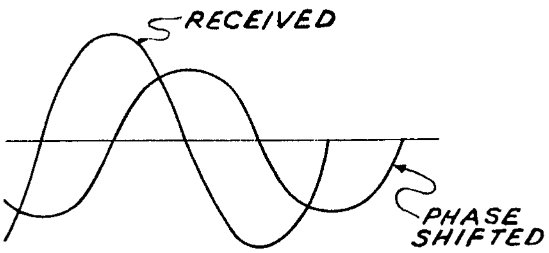

Referring to FIG. 1, the receiver output is applied to a group decoder 1 which separates the above described reference groups and applies them to phase locked oscillator 2. FIG. 2*a* shows the reference groups signals, and FIG. 2b shows the output of oscillator 2 triggered at its zero point by the group pulses of FIG. 2*a*. This signal is applied to phase shifter 3 which shifts the applied signal in the direction of coincidence with the envelope of the received signal samples. The received signal samples and their envelope are shown in FIG. 2*c*. FIG. 2*d* illustrates the output of oscillator 2 phase shifted in the direction of the received signal envelope. For explanation purposes, the output of oscillator 2 has not been shifted a sufficient amount to bring it to phase coincidence with the envelope of the received signal. This is illustrated in FIG. 2*e*. It should also be noted in FIG. 2*e* that the peak amplitude of the received signal is greater than that of the locally generated signal. The output of oscillator 2 and the output of phase shifter 3 is applied to the bearing determination circuitry (typically a phase meter).

The received signal is also applied to a comparator 4 which compares the receiver signal both in amplitude and phase to the locally generated signal. Comparator 4 produces an error signal of the type shown in FIG. 2*f* which will ultimately be used to modify the amplitude and phase of the local signal in the direction of coincidence with the envelope of the received signal. It should be clear that the error signal consists of samples determined by subtracting the envelope of the received signal from the phase shifted locally generated signal shown in FIG. 2*e*.

Figure 2F:
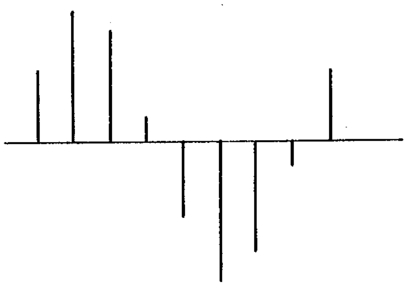
Figure 2G:
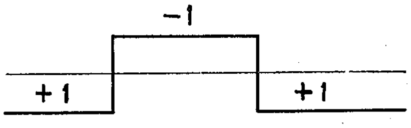
Figure 2H:
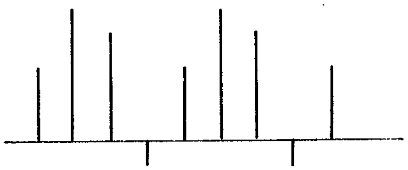

The amplitude of the shifted signal is modified by multiplier 5 whose output is combined with corrections due to other components of modulation. This combination occurs in adder 6. It should be clear that the block diagram shown in FIG. 1 processes only one component of the modulation, for instance, the 15 cycle Tacan modulation component. Corrections required due to other modulation components and harmonics must be arrived at in the same manner and combined in adder 6. The error signal shown in FIG. 2*f* is multiplied in multiplier 7 by the locally generated phase shifted signal and the output of limiter 8. FIG. 2*g* shows the output limiter 8 with appropriate sense designations assigned thereto. The output of multiplier 7 is shown in FIG. 2*h*. It should be clear from FIG. 2*h* that the correction signal is such as to bring about an increase in peak amplitude. This signal is integrated via integrator 9 and applied to multiplier 5. The amplitude of the waveform produced by multiplier 5 is intended to coincide with the amplitude of the envelope of the received signal.

Figure 2I:
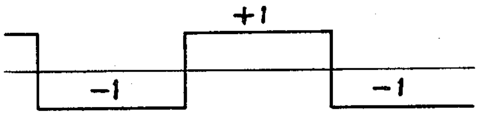
Figure 2J:
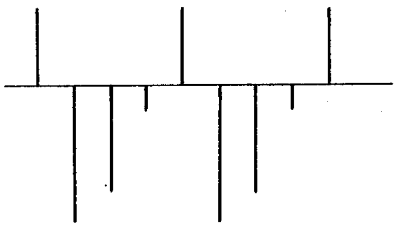

The error signal (FIG. 2f) is also applied to multiplier 10 as is the locally generated phase shifted signal shifted in phase by 90° and then limited via 90° phase shifter 11 and limiter 12. The output of limiter 12 is shown in FIG. 2i with appropriate sense designations assigned thereto. FIG. 2j illustrates the output of multiplier 10, and it should be noted that the samples in FIG. 2j after being integrated in integrator 11 have an average negative value having a tendency to decrease the phase of the locally generated signal thereby shifting the phase in the direction of the envelope of the received signal.

It is to be understood that the foregoing description of specific examples of this invention is made by way of example only and is not to be considered as a limitation on its scope.

I claim:

1. An apparatus for generating a local signal which is coincident in phase and in amplitude with a received signal comprising:

a local oscillator for generating said local signal;

means coupled to said local oscillator and to said received signal for triggering said local oscillator at a predetermined point on said received signal;

means coupled to the output of said local oscillator and to said received signal for comparing said local signal and said received signal and generating an error signal if said local signal and said received signal are not coincident;

phase shifting means coupled between said local oscillator and said comparing means;

first means responsive to said error signal and coupled between said comparing means and said phase shifting means for altering the amplitude of said local signal in the direction of coincidence; and second means responsive to said error signal and coupled between said comparing means and said phase shifting means for controlling said phase shifting means.

2. An apparatus according to claim 1 wherein said first responsive means comprises:

first multiplying means for multiplying said error signal with said phase shifted signal to obtain an average amplitude correction signal; and second means coupled between said phase shifting means and said comparing means and having as an input said average amplitude correction signal for multiplying said phase shifted signal by said average amplitude correction signal to alter the amplitude of said local signal in the direction of coincidence with said received signal.

3. An apparatus according to claim 2 wherein said first multiplying means includes:

an amplitude limiter having an input coupled to said phase shifted signal;

a first multiplier having a first input coupled to the output of said limiter and a second input coupled to said error signal; and an integrator having an input coupled to the output of said multiplier and having an output which is applied to the input of said second multiplying means.

4. An apparatus according to claim 1 wherein said second responsive means comprises:

a 90° phase shifter having an input coupled to the output of said phase shifter;

an amplitude limiter having an input coupled to the output of said 90° phase shifter;

a second multiplier having one input coupled to the output of said second limiter and another input coupled to said error signal; and an integrator having an input coupled to the output of said second multiplier and having an output coupled to said phase shifting means for controlling the amount of phase shift.

* * * * *